(12) United States Patent
Lin

(10) Patent No.: US 9,351,189 B2
(45) Date of Patent: *May 24, 2016

(54) METHOD FOR REPORTING MINIMIZATION DRIVE TEST MEASUREMENT DATA

(71) Applicant: Industrial Technology Research Institute, Hsinchu County (TW)

(72) Inventor: Jung-Mao Lin, New Taipei (TW)

(73) Assignee: INDUSTRIAL TECHNOLOGY RESEARCH INSTITUTE, Hsinchu County (TW)

( * ) Notice: Subject to any disclaimer, the term of this patent is extended or adjusted under 35 U.S.C. 154(b) by 111 days.

This patent is subject to a terminal disclaimer.

(21) Appl. No.: 13/964,451

(22) Filed: Aug. 12, 2013

(65) Prior Publication Data

US 2014/0043990 A1 Feb. 13, 2014

Related U.S. Application Data

(60) Provisional application No. 61/681,624, filed on Aug. 10, 2012.

(51) Int. Cl.
*H04W 24/10* (2009.01)
*H04W 74/00* (2009.01)
*H04W 72/12* (2009.01)
*H04W 74/08* (2009.01)

(52) U.S. Cl.
CPC ............ *H04W 24/10* (2013.01); *H04W 74/006* (2013.01); *H04W 72/1278* (2013.01); *H04W 74/0833* (2013.01)

(58) Field of Classification Search
None
See application file for complete search history.

(56) References Cited

U.S. PATENT DOCUMENTS

| 2011/0183662 | A1* | 7/2011 | Lee et al. | 455/422.1 |
| 2012/0040621 | A1* | 2/2012 | Jung et al. | 455/67.11 |
| 2012/0064886 | A1* | 3/2012 | Kim et al. | 455/423 |
| 2012/0082051 | A1* | 4/2012 | Kim et al. | 370/252 |

FOREIGN PATENT DOCUMENTS

| CN | 102342145 A | 2/2012 |
| CN | 102595482 A | 7/2012 |
| EP | 2154927 A1 | 2/2010 |

(Continued)

OTHER PUBLICATIONS

Office Action issued in Chinese Patent Application No. 201522301633430, dated Dec. 28, 2015.

*Primary Examiner* — Gregory Sefcheck
*Assistant Examiner* — Rina Pancholi
(74) *Attorney, Agent, or Firm* — Birch, Stewart, Kolasch & Birch, LLP

(57) ABSTRACT

A method for reporting minimization of drive tests measurement data is disclosed. The network assigns a preamble dedicated to the reporting of the logged MDT measurement data. The UE in the idle mode may therefore report the logged MDT measurement data in the appropriate situation. The UEs perform the first random access procedure with the network to obtain the uplink resource and a dedicate indicator for performing the second random access procedure. The UEs perform the second random access procedure for transmitting the request message. The network transmits the response message with a scheduling plan according to the request message(s). The UE transmits the logged MDT measurement data according to the scheduling plan.

22 Claims, 3 Drawing Sheets

(56) References Cited

FOREIGN PATENT DOCUMENTS

| WO | WO 2010/107358 A1 | 9/2010 |
| WO | WO 2011/093665 A2 | 8/2011 |
| WO | WO 2011/101026 A1 | 8/2011 |
| WO | WO 2011101026 A1 * | 8/2011 ............ H04W 24/10 |

* cited by examiner

METHOD FOR REPORTING MINIMIZATION DRIVE TEST MEASUREMENT DATA

CROSS-REFERENCE TO RELATED APPLICATIONS

This application claims the benefit of priority to U.S. Provisional Application Ser. No. 61/681,624, filed on Aug. 10, 2012; the entirety of which is incorporated herein by reference for all purposes.

BACKGROUND

The disclosure generally relates to mobile communications and, more particularly, to a method for reporting minimization of drive tests measurement data in mobile communications.

Nowadays, the mobile communication plays a more and more important role in people's daily life. Therefore, the network operators have invested tremendous times and money to ensure the quality and the reliability of the mobile communications. Conventionally, the network operators send engineers and measurement vehicles to the concerned areas for performing drive tests so as to collect radio measurement data, discover communication problems, etc. Not only do the conventional drive tests require high operation expenditure, but also the accuracy of the measurement data is limited by the complicated radio environment.

SUMMARY

In view of the foregoing, it may be appreciated that a substantial need exists for methods and apparatuses that mitigate or reduce the problems above.

An example embodiment of a method for a user equipments (UE) in a idle mode to report logged minimization of drive tests (MDT) measurement data, comprising: transmitting a first preambles; receiving a first random access response (RAR) indicating a first uplink resource and a dedicate indicator; transmitting a second preamble at the first uplink resource; receiving a second RAR indicating a second uplink resource; transmitting a request message at the second uplink resource; receiving a response message comprising a scheduling plan indicating a third uplink resource to report the logged MDT measurement data; and transmitting the logged MDT measurement data at the third uplink resource.

Another example embodiment of a method for a user equipments (UE) in a idle mode to report logged minimization of drive tests (MDT) measurement data, comprising: transmitting a first preambles; receiving a random access response (RAR) indicating a first uplink resource and a dedicate indicator; transmitting a request message at the first uplink resource; receiving a response message comprising a second uplink resource to report the logged MDT measurement data; and transmitting the logged MDT measurement data at the second uplink resource.

Another example embodiment of a method for receiving logged minimization of drive tests (MDT) measurement data from one or more user equipments (UEs), comprising: receiving one or more first preambles from the one or more UEs; determining a first uplink resource to be granted to a first user equipment (UE); transmitting a first random access response (RAR) to the first UE for indicating the first uplink resource and a dedicate indicator; receiving a second preamble from the first UE at the first uplink resource; transmitting a second RAR to the first UE for signaling a second uplink resource; receiving a request message from the first UE at the second uplink resource; transmitting a response message comprising a scheduling plan to the first UE for indicating a third uplink resource to report the logged MDT measurement data of the first UE; and receiving the logged MDT measurement data of the first UE at the third uplink resource.

Another example embodiment of a method for receiving logged minimization of drive tests (MDT) measurement data from a user equipments (UE), comprising: receiving a first preambles from the UE; granting a first uplink resource to the UE; transmitting a random access response (RAR) to the UE for indicating the first uplink resource; receiving a request message from the UE at the first uplink resource; transmitting a response message comprising a second uplink resource for the UE to report the logged MDT measurement data; and receiving the logged MDT measurement data of the UE at the second uplink resource.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
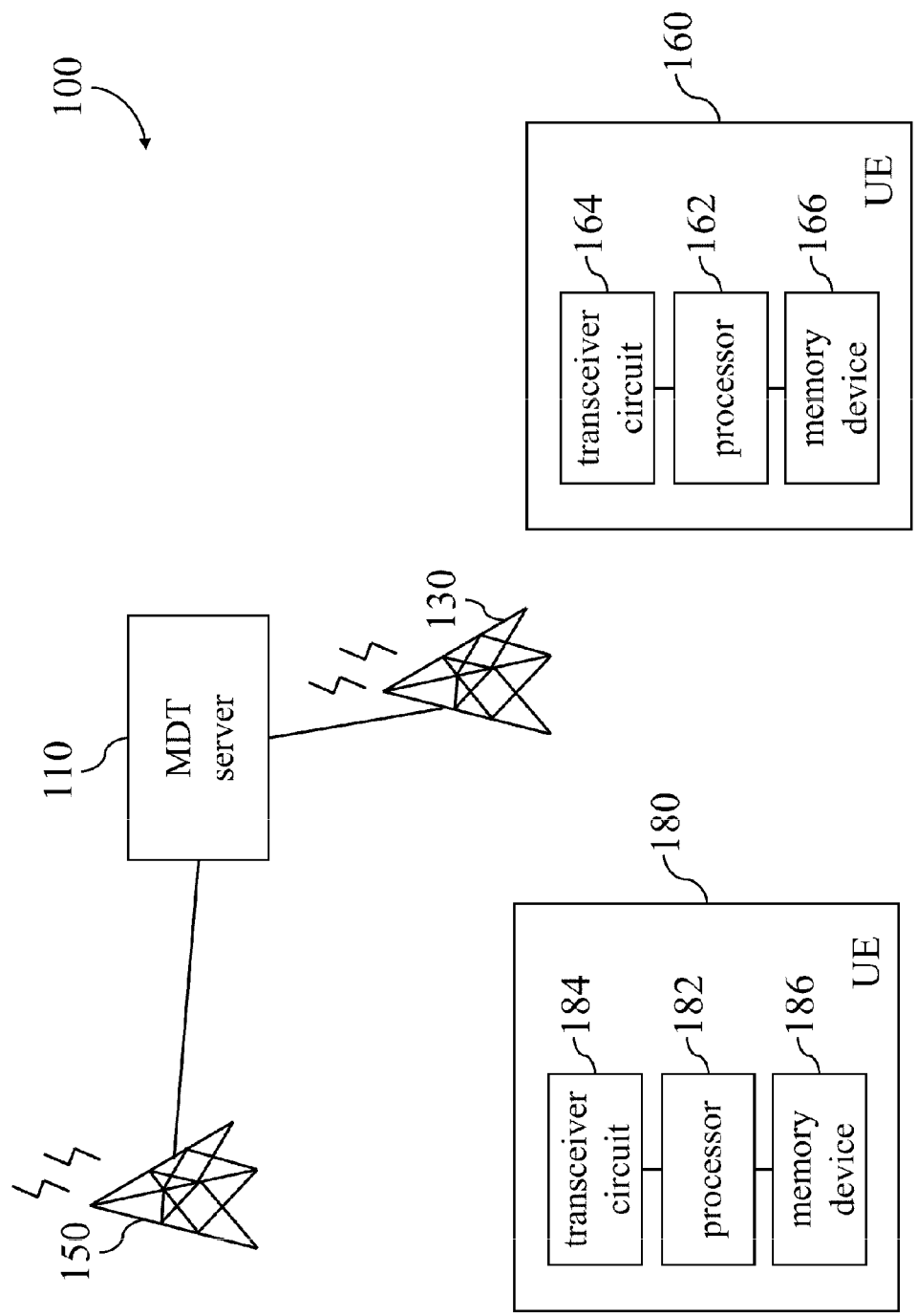
FIG. 1 shows a simplified functional block diagram of a communication system according to one embodiment of the present disclosure.

FIG. 1 shows a simplified functional block diagram of a communication system 100 according to one embodiment of the present disclosure. The communication system 100 comprises an MDT server 110, remote access network (RAN) nodes 130 and 150, and user equipments (UEs) 160 and 180. For the purposes of conciseness and clear explanation, other components and connections are not shown in FIG. 1. For example, there may be multiple MDT servers, more RAN nodes and more UEs in the communication system 100.

The MDT server 110 is configured to perform the minimum of drive tests measurement related operations in the network.

The RAN nodes 130 and 150 is configured to perform radio communications with the UEs 160 and 180, and may be respectively realized with the node B, the evolved node B, the home node B, base transceiver station, etc.

The UEs 160 and 180 respectively comprise processors 162 and 182, transceiver circuits 164 and 184, and memory device 166 and 186. Moreover, the UEs 160 and 180 have the capability of performing MDT measurement. For example, the UEs 160 and 180 may be realized with mobile phones, tablet computers or other suitable mobile devices.

Figure 2:
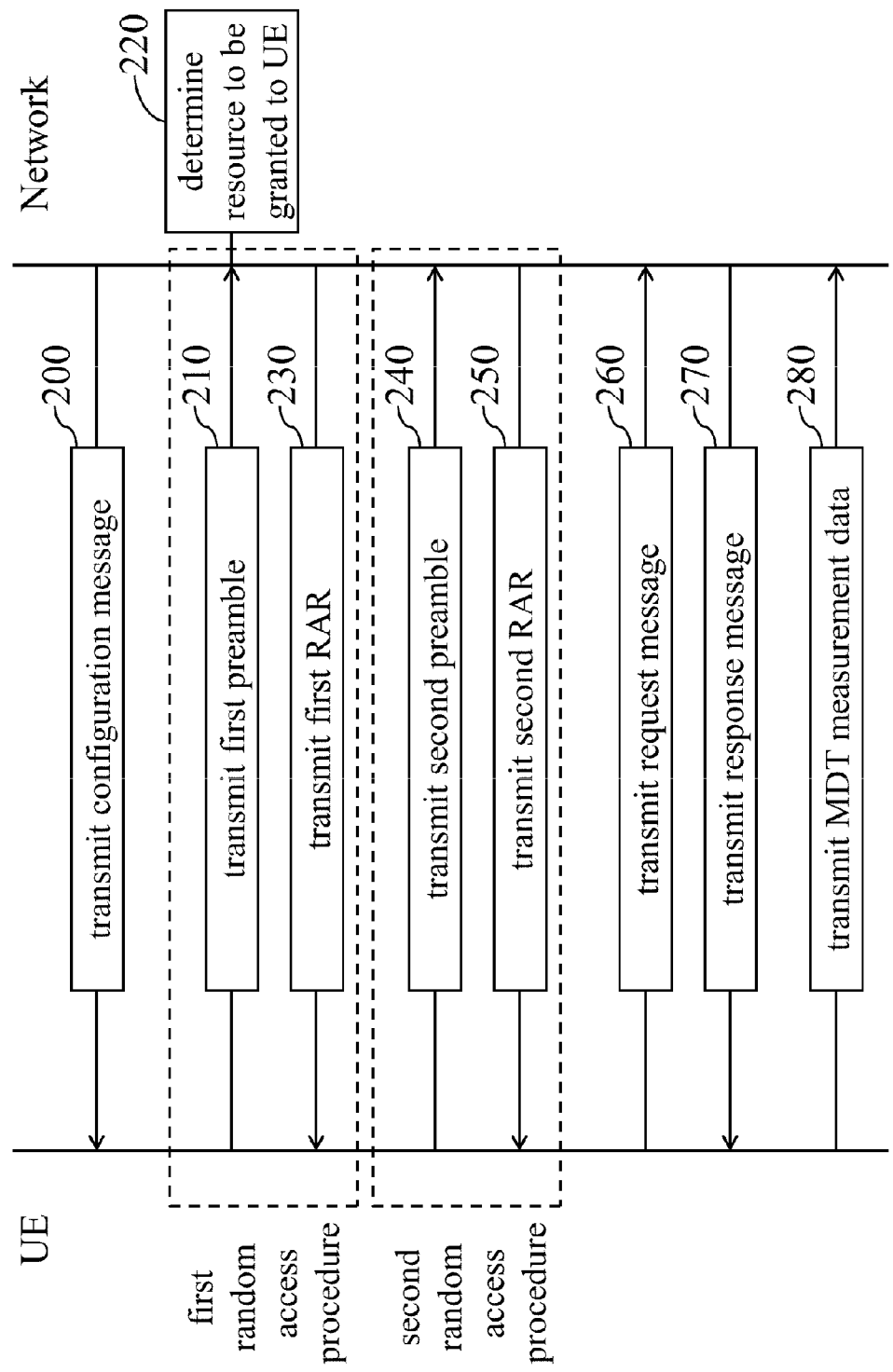
FIG. 2 shows a simplified flowchart of a method for the UEs in the idle mode to report logged MDT measurement data in the communication system in FIG. 1 according to one embodiment of the present disclosure.

FIG. 2 shows a simplified flowchart of a method for the UEs 160 and 180 in the idle mode to report logged MDT measurement data in the communication system 100 in FIG.

1 according to one embodiment of the present disclosure. The operations of the communication system 100 are further explained below with FIGS. 1 and 2. For the purpose of conciseness, the MDT server 110 and the RAN nodes 130 and 150 are collectively shown as "the network" in FIG. 2.

In the operation 200, the network transmits a configuration message to the UEs 160 and 180 for assigning a first preamble dedicated to performing the reporting of the logged MDT measurement data. For example, the first preamble may be chosen from the set of 64 preambles and specifically designated for the use of performing the reporting of the logged MDT measurement data. In one embodiment, the network may utilize the "Logged Measurement Configuration" message for assigning the first preamble to the UEs 160 and 180.

In the operation 210, the UE in the idle mode is ready to send the logged MDT measurement data and therefore sends the first preamble to the network. In this embodiment, the UE transmit the first preamble by performing a first random access procedure in the packet random access channel (PRACH).

In the operation 220, the network determines the uplink resources needed to be granted in the second random access procedure for reporting the logged MDT measurement data according to the number of the received first preamble(s). In one embodiment, the network may calculate the number of the received first preamble according to the random access resources opportunities used by the UE(s) to transmit the first preamble(s). In another embodiment, the network may also calculate the number of the received first preamble according to the power ratio of the random access resources.

In the operation 230, the network transmits a first random access response (RAR) associated with the first preamble to the UE for signaling a first uplink resource and a dedicate indicator. The first uplink resource is utilized by the UE to transmit a second preamble in the second random access. The dedicate indicator is utilized for the UE to receive the second RAR in the second random access process. For example, the network may utilize a dedicated random access radio network temporary identifier (RA-RNTI) which is dedicated to the reporting of the logged MDT measurement data as the dedicate indicator.

In the operation 240, after the UE received the first RAR, the UE randomly selects a preamble to be the second preamble and transmits the second preamble at the first uplink resource indicated in the first RAR. Moreover, the second preamble is configured to be different from the first preamble. If the UE does not receive the first RAR, the UE may abort the procedure of reporting the logged MDT measurement data and stay in the idle mode.

In the operation 250, the network transmits a second RAR to the UEs. The second RAR comprises one or more media access control (MAC) packet data units (PDUs). Each of the MAC PDUs carries one or more second uplink resources for the UE to transmit a request message, and carries one or more corresponding uplink timing references for the UE to perform the uplink synchronization.

In conventional random access procedure, the UE uses a non-dedicated RNTI to find the MAC PDU carrying the RAR, and the non-dedicated RA-RNTI is associated with the uplink resource which the UE transmits the preamble. In this embodiment, multiple UEs are configured to find the MAC PDU by using the dedicated RA-RNTI which is dedicated to the reporting of the logged MDT measurement data. Because if the UE still uses a non-dedicated RNTI associated with the uplink resource to find the MAC PDU carrying the second RAR, the non-dedicated RNTI may conflict with other RNTIs. Consequently, the contention will occur even if the UEs use different uplink resources.

Moreover, there may be multiple UEs use the same dedicated RA-RNTI to receive the second RAR, and the contention may still occur even if different UEs transmit the second preambles at different uplink resources. To resolve this issue, the network may add a dedicate identification in the second RAR for the MAC PDUs. The dedicate identification is used to differentiate the UEs when the UEs transmit the second preambles at different uplink resources. For example, the dedicate identification may be calculated from the uplink resource which the UE transmits the second preamble. Thus, even if the same preambles are transmitted at different uplink resources by different UEs, the network may still distinguish them and the UEs may find the correct MAC PDU carrying the second RAR.

In the operation 260, the UE finds the MAC PDU carrying the second RAR by using the dedicate identification and the dedicated RA-RNTI which is dedicated to the reporting of the logged MDT measurement data. The UE may therefore transmit a request message at the second uplink resource indicated in the second RAR. Moreover, in order to provide the contention resolution function, the UE may transmit a request message associated with a UE specific identity (e.g., the UE identity) which is uniquely associated with the UE.

In the operation 270, the network receives the request messages and sends a response message to the UE with a scheduling plan. The scheduling plan comprises the third uplink resources granted for the UEs to report the logged MDT measurement data.

Moreover, a contention resolution identity may also be transmitted in the response message to be compared with the UE specific identity. When the contention resolution identity is the same as the UE specific identity, the contention resolution successes. Otherwise, the contention resolution fails and the UE may abort the procedure of reporting the logged MDT measurement data.

In the operation 280, the UE transmits the logged MDT measurement data according to the scheduling plan transmitted in the response message.

After the UE finishes the transmission of the logged MDT measurement data, the UE may clean the memory for storing the MDT measurement data and stay in the idle mode.

Figure 3:
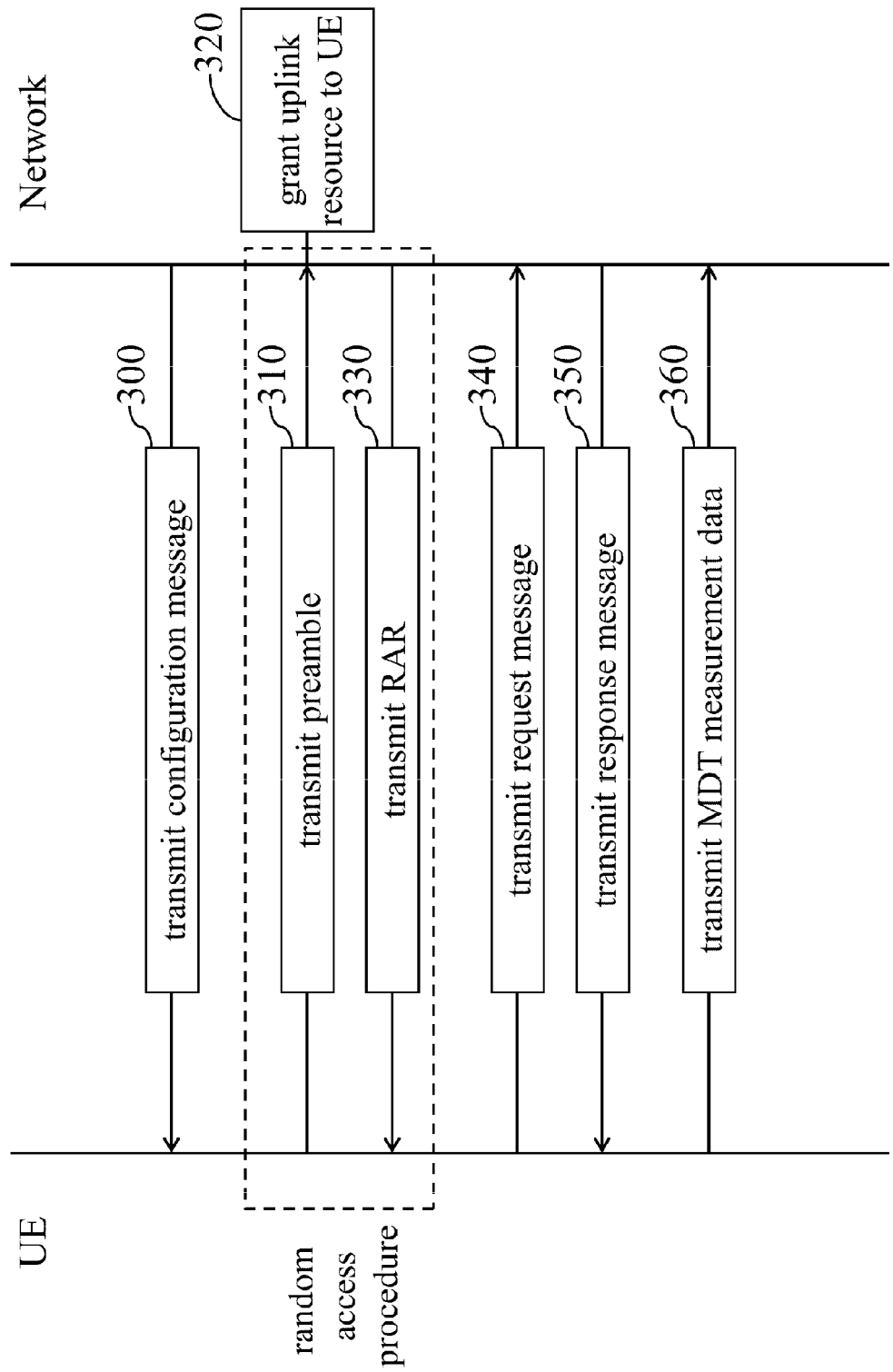
FIG. 3 shows a simplified flowchart of a method for the UEs in the idle mode to report logged MDT measurement data in the communication system in FIG. 1 according to another embodiment of the present disclosure.

FIG. 3 shows a simplified flowchart of a method for the UEs in the idle mode to report logged MDT measurement data in the communication system 100 in FIG. 1 according to another embodiment of the present disclosure. The operations of the communication system 100 are further explained below with FIGS. 1 and 3. For the purpose of conciseness, the MDT server 110 and the RAN nodes 130 and 150 are collectively shown as "the network" in FIG. 3.

In the operation 300, the network transmits a configuration message to the UEs 160 and 180 for assigning a first preamble dedicated to performing the reporting of the logged MDT measurement data. For example, the first preamble may be chosen from the set of 64 preambles and specifically designated for the use of performing the reporting of the logged MDT measurement data. In one embodiment, the network may utilize the "Logged Measurement Configuration" message for assigning the first preamble to the UEs 160 and 180.

In the operation 310, the UE in the idle mode is ready to send the logged MDT measurement data and therefore sends the first preamble to the network. In this embodiment, the UE transmit the first preamble by performing a random access procedure in the PRACH.

In the operation 320, the network grants a first uplink resource for the UE to report the logged MDT measurement data.

In the operation 330, the network transmits a RAR associated with the first preamble to the UE for signaling the first uplink resource to transmit a request message In the operation 340, the UE may transmit a request message at the first uplink resource indicated in the RAR.

In the operation 350, the network receives the request messages and sends a response message to the UE with the second uplink resource. According to the received request message, the network may allocate a suitable amount of the second uplink resource for the UE to report the logged MDT measurement data.

In the operation 360, the UE transmits the logged MDT measurement data according to the second uplink resource transmitted in the response message.

After the UE finishes the transmission of the logged MDT measurement data, the UE may clean the memory for storing the MDT measurement data and stay in the idle mode.

In the above embodiments, the UEs in the idle mode may initiate the reporting of the logged MDT measurement when it is appropriate, e.g., when the memory for storing the logged MDT measurement data is full. Moreover, the UEs may report the logged MDT measurement data without entering the connection mode. Therefore, the design complexity and the power consumption of the UE may be effectively reduced.

In the above embodiments, by utilizing the dedicate identification of the UE, the UE specific identity, the contention resolution identity, etc., a suitable contention resolution mechanism may be provided.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A method for a user equipment (UE) in an idle mode to report logged minimization of drive tests (MDT) measurement data, comprising:
   transmitting, in the idle mode, a first preamble of a first random access procedure;
   receiving, in the idle mode, a first random access response (RAR) of the first random access procedure, which indicates a first uplink resource and a dedicate indicator;
   transmitting, in the idle mode, a second preamble of a second random access procedure at the first uplink resource;
   receiving, in the idle mode, a second RAR of the second random access procedure, which indicates a second uplink resource;
   transmitting, in the idle mode, a request message at the second uplink resource;
   receiving, in the idle mode, a response message comprising a scheduling plan indicating a third uplink resource to report the logged MDT measurement data; and
   transmitting, in the idle mode, the logged MDT measurement data at the third uplink resource.

2. The method of claim 1, further comprising:
   receiving a configuration message for assigning the first preamble dedicated to performing the reporting of the logged MDT measurement data.

3. The method of claim 1, further comprising:
   locating a media access control packet data unit carrier in the second RAR according to the dedicate indicator; and
   locating the second uplink resource according to the media access control packet data unit carrier in the second RAR.

4. The method of claim 3, further comprising:
   receiving a dedicate identification in the second RAR for representing the UE;
   wherein the dedicate identification is calculated according to the first uplink resource in which the UE transmitting the second preamble.

5. The method of claim 1, further comprising:
   transmitting a UE specific identity uniquely associated with the UE in the request message.

6. The method of claim 5, wherein the response message comprises a contention resolution identity for comparing with the UE specific identity so as to perform a contention resolution.

7. The method of claim 1, wherein the first preamble is dedicated to the reporting of the logged MDT measurement data and is different from the second preamble.

8. The method of claim 1, further comprising:
   cleaning a memory for storing the logged MDT measurement data after transmitting the logged MDT measurement data; and
   staying in the idle mode after cleaning the memory.

9. A method for a user equipment (UE) in an idle mode to report logged minimization of drive tests (MDT) measurement data, comprising:
   transmitting, in the idle mode, a first preamble;
   receiving, in the idle mode, a random access response (RAR) indicating a first uplink resource and a dedicate indicator;
   transmitting, in the idle mode, a request message at the first uplink resource;
   receiving, in the idle mode, a response message comprising a second uplink resource to report the logged MDT measurement data; and
   transmitting, in the idle mode, the logged MDT measurement data at the second uplink resource.

10. The method of claim 9, further comprising:
receiving a configuration message for assigning the first preamble dedicated to performing the reporting of the logged MDT measurement data.

11. The method of claim 9, further comprising:
cleaning a memory for storing the logged MDT measurement data after transmitting the logged MDT measurement data; and
staying in an idle mode after cleaning the memory.

12. A method for receiving logged minimization of drive tests (MDT) measurement data from one user equipment (UE) in an idle mode, comprising:
receiving one first preamble of a first random access procedure from a UE in the idle mode;
determining a first uplink resource to be granted to the UE in the idle mode;
transmitting a first random access response (RAR) of the first random access procedure to the UE in the idle mode for indicating the first uplink resource and a dedicate indicator;
receiving a second preamble of a second random access procedure from the UE in the idle mode at the first uplink resource;
transmitting a second RAR of the second random access procedure to the UE in the idle mode for signaling a second uplink resource;
receiving a request message from the UE in the idle mode at the second uplink resource;
transmitting a response message comprising a scheduling plan to the UE in the idle mode for indicating a third uplink resource to report the logged MDT measurement data of the UE; and
receiving the logged MDT measurement data of the UE in the idle mode at the third uplink resource.

13. The method of claim 12, further comprising:
transmitting a configuration message to the UE for assigning the first preamble dedicated to performing the reporting of the logged MDT measurement data.

14. The method of claim 12, further comprising:
determining the first uplink resource to be granted to the UE in the idle mode according to at least one of a number of random access opportunities and a power ratio of one or more received resource slots.

15. The method of claim 12,
wherein the dedicate indicator is transmitted in the first RAR so that the UE in the idle mode locates a media access control packet data unit carrier in the second RAR according to the dedicate indicator and locates the second uplink resource according to the media access control packet data unit carrier in the second RAR.

16. The method of claim 12, wherein the second RAR comprises a dedicate identification for representing the UE and the dedicate identification is calculated according to a resource slot in which the UE transmitting the second preamble.

17. The method of claim 12, wherein the request message comprises a UE specific identity uniquely associated with the UE.

18. The method of claim 17, wherein the response message comprises a contention resolution identity for comparing with the UE specific identity so as to perform a contention resolution.

19. The method of claim 12, wherein the first preamble is dedicated to the reporting of the logged MDT measurement data and is different from the second preamble.

20. A method for receiving logged minimization of drive tests (MDT) measurement data from a user equipment (UE) in an idle mode, comprising:
receiving a first preamble from the UE in the idle mode;
granting a first uplink resource to the UE in the idle mode;
transmitting a random access response (RAR) to the UE in the idle mode for indicating the first uplink resource;
receiving a request message from the UE in the idle mode at the first uplink resource;
transmitting a response message comprising a second uplink resource for the UE in the idle mode to report the logged MDT measurement data; and
receiving the logged MDT measurement data of the UE in the idle mode at the second uplink resource.

21. The method of claim 20, further comprising:
receiving a configuration message for assigning the first preamble dedicated to performing the reporting of the logged MDT measurement data.

22. The method of claim 20, further comprising:
allocating the second uplink resource according to the request message.

* * * * *